United States Patent Office 2,848,423
Patented Aug. 19, 1958

2,848,423

PREPARATION OF KAOLIN CATALYSTS

George Alexander Mills, Swarthmore, and Gerhardt Talvenheimo, Chester, Pa., assignors to Houdry Process Corporation, Wilmington, Del., a corporation of Delaware No Drawing. Application July 20, 1954
Serial No. 444,638

4 Claims. (Cl. 252—449)

The present invention relates to solid adsorbents and contact masses prepared from clays and more particularly to kaolin-type adsorbents and contact masses useful as catalysts in the conversion of hydrocarbons and for other purposes, and to the preparation of such contact masses.

It has been proposed before to make use of various clays including kaolin-type clays in the preparation of catalytically active contact masses, and valuable catalysts for the conversion of hydrocarbons have thus been prepared. While with many clays, particularly with those of the montmorillonite or bentonite group, it has proved advantageous to activate them by a treatment with acids, such a treatment alone, in general, has not been found to effect desired activation of kaolin-type clays. In so far as the raw clays and those activated by acid treatment still may contain substantial amounts of iron compounds, it has been proposed to remove at least the major part of the iron by suitable treatment, for instance by sulfiding and subsequent leaching the clay, pretreated or not by acids, as the iron of the clay is damaging to the catalytic properties thereof, particularly where sulfur-containing stocks are treated by this catalyst.

It has now been found in the case of those kaolin-type clays which are plastic by nature, that the clay particles of relatively large size, particularly such of a size greater than two microns, have a relatively poor catalytic cracking activity as compared with the smaller particle size material, probably because of large crystallite size and relatively low surface area.

It has, therefore, been found advantageous in the preparation of active hydrocarbon catalysts from such clays of the kaolin type to eliminate therefrom substantially all or at least the major part of those particles which have a size of more than two microns.

In accordance with the present invention, an active contact mass useful as catalyst in the conversion of hydrocarbon stocks is prepared from plastic kaolin clays, by eliminating therefrom substantially all or at least a major part of those particles which belong to the greater than two microns fraction. Thus, the new contact mass, in accordance with the present invention consists essentially or mainly of particles of plastic kaolin-type clays of a size of two microns or less. It has been ascertained that such kaolin-type contact mass composed substantially of particles of the described size range exhibits greater catalytic activity in the conversion of hydrocarbons than a contact mass prepared from other raw kaolin-type clays containing largely clay particles (and other possible accessory particles) of a size substantially greater than two microns. The present discovery of the difference in activity portrayed by catalysts prepared from these smaller particle size plastic kaolin clays was wholly unexpected, since in contrast thereto, no significant effect of particle size on catalyst activity has been found in the case of the nonplastic kaolins nor the plastic sub-bentonite clays of the montmorillonite family whether in raw state or in conventional acid activated condition.

The removal of all the particles or at least of the main portion of the particles substantially greater than about two microns from the clay may be carried out in any convenient manner, such as by sedimentation and settling from an aqueous dispersion of the raw, finely divided clay, or by treating such a dispersion in a continuous centrifuge, or by dispersion of the finely divided raw clay in a gas to remove coarser particles, and subsequent separation of the dispersed finest particles of the clay by cyclones. In any case, separation of fine particles desired for the catalyst through a sieve of a mesh suitable to retain a substantial portion of particles of a size substantially greater than two microns may also be used in combination with the above-mentioned or any other fractionating method.

Peptizing means for finely dispersing the clay particles are preferably added in the fractionating treatment, such as for instance ammonia, ammonium salts or the like, to facilitate the separation of the particles of different size and to increase the volume of the mass under treatment.

It has been ascertained that the iron content of kaolin-type clays of a particle size of two microns and less generally is relatively higher than that of coarser particles. While plastic kaolin-type clays of a particle size of no more than two microns have proved generally to be very effective as hydrocarbon conversion catalysts even if they still contain the iron present in the raw clays, it has further been found that such catalysts can be further improved by removal of at least a substantial part of the iron originally contained in said small sized clay particles. This removal of iron therefrom advantageously can be effected in accordance with one of the methods described in U. S. Patents 2,466,046; 2,466,047; 2,466,048; 2,466,049 and 2,466,052, all of Hubert A. Shabaker, George Alexander Mills and Ruth C. Denison. In accordance with these methods, clay containing iron compounds is treated at a temperature of at least 1200° F. and insufficient to effect incipient fusion of the clay, with a chemical reagent in gaseous form reactive with iron to form acid soluble iron salts, and leaching the thus treated clay to remove acid soluble iron salts. Preferably, the iron-containing clays are treated in accordance with these prior patents under the above-named conditions with a sulfiding agent, such as hydrogen sulfide, carbon disulfide vapors, or sulfur in vapor form. Instead of removing the soluble iron salts formed, such as particularly iron sulfide, by leaching with dilute mineral acids or the like, their removal can advantageously also be effected in accordance with co-pending U. S. patent application Serial No. 444,637, filed of even date herewith, by subjecting the treated iron-containing kaolin-type clay of a particle size of two microns or less to a treatment with ammonium chloride at a temperature sufficient to transform the iron compounds of the material under treatment into ferric chloride but insufficient to reduce trivalent iron compounds to bivalent ones by free hydrogen which may be developed at higher temperatures by decomposition of the ammonium group of ammonium compounds. After this treatment, the kaolin-type clay is subjected to purging by an inert gaseous medium at an elevated temperature high enough to vaporize ferric chloride but insufficient to effect said reduction of ferric chloride to ferrous chloride.

The discussed removal of substantial parts of the iron from the kaolin-type clay, or the like, may be carried out either before the small particles of two microns and less size are separated from the raw clay, or afterwards. The latter method, however, will generally be more convenient.

Although in certain known processes of hydrocarbon conversion the catalyst can be employed in the form of finely divided particles or powders suspended in the charge stock, in other procedures as in fixed or moving catalyst bed operation, the catalyst is advantageously employed in the form of large aggregates or agglomerated masses such as pellets, tablets, coarse granules, or the like. The present invention in its specific aspects is more particularly concerned with such larger aggregates. These aggregates may be formed by compressing the dry finely divided particles or powders in a pelleting machine or by previously wetting the dry clay with water or other inert liquid that will bind the small particles or powder into a cake, which, after drying, can be broken up into granules or fragments of desired sizes, or the wet mix can be formed into more regular shapes by molding including casting, extruding or the like. The pellets or granules or other aggregates formed should be of a size that can be efficiently employed in catalytic processes. Pellets, granules, tablets or other larger aggregates will thus be obtained which are completely or mainly composed of kaolin particles of 2 microns or less size.

In the case that the iron is substantially to be removed from the kaolin particles, the treatment for this purpose described above is preferably carried out after the larger aggregates have been formed therefrom, since the high temperature treatment required therein destroys the plasticity of the kaolin-type clay and the formation of larger, stronger, noncrumbling aggregates would, therefore, be made difficult or even impossible thereby.

It has been found advantageous, in accordance with copending U. S. patent application Serial No. 444,636, filed of even date herewith, to admix with the small kaolin particles a material removable by heat treatment, preferably a combustible organic finely divided materal, such as wood floor, finely ground petroleum coke, carbon black, or mixtures of several of such materials. Such an admixture is particularly useful where the small kaolin-type clay particles of 2 microns or less size are to be agglomerated to form larger aggregates, such as pellets, granules, or the like. An amount of 5-12% (of the dry clay), preferably 8-10%, of wood flour or the like may suitably be employed to form the mixture. This addition is made before the pelleting or otherwise shaping of the clay material. Apart from higher porosity obtained for the clay aggregates, it has been ascertained that these aggregates after burning out the combustible material are harder, and have greater mechanical strength than catalysts obtained from shaped aggregates of kaolin-type clay, or the like of a particle size of 2 microns and less, prepared without said admixture.

The removal of the previously admixed combustible material from the clay aggregates is carried out by heating these aggregates to a temperature high enough to effect said combustion. In the case that the clay particle aggregates are to be freed from a substantial part or from substantially all of their iron contained in the kaolin-type clay in the manner described before, the removal of the combustible admixture is preferably combined with the heating of the mixed aggregates during the sulfiding or other corresponding operation, or/and the operations that are required for removal of the iron compounds formed before. The said admixture of combustible material is particularly advantageous where the clay particles are to be freed from iron as the higher porosity of clay particle aggregates obtained on removal of the combustible admixture will allow a better penetration of said aggregates by the treating means and, therefore, will cause a still more thorough removal of the undesirable iron.

The activity herein referred to is that determined by the standard "Cat-A" method described by J. Alexander in Proc. Am. Petroleum Inst. (III), volume 27, page 51 (1947), and involves passing a standard gas oil over the catalyst to be tested at 800° F. for a ten-minute period at 1.5 liquid hourly space velocity and measuring the products—gasoline, gas, and coke—under well-defined conditions; the volume percent gasoline as determined is reported as the Cat-A activity of the catalyst.

While the invention has been described with reference to the separation from a clay mass of particles above 2 microns size, it is not intended to be implied thereby that all plastic kaolin particles of below 2 microns size are equally beneficial in the selected small particle size fraction for preparation of cracking catalyst. It will be appreciated that in the fraction of less than 2 microns size there ordinarily will exist a wide and progressive range of different sized particles going down to colloidal size or less, the size distribution of which may differ largely in kaolin clays from different mines or localities. Catalysts of further improved activity are obtained by the selection or provision of a less than 2 microns size fraction wherein the major part of the fraction is composed of particles of even less than 1 micron size.

While the greatest degree of improvement in activity is obtained by the described particle size selection in the case of clay samples having comparatively large portions thereof lying in the larger than 2 microns size, the described fractionation has also been found beneficial, although to a lesser extent, in the improvement of those plastic kaolin clays which have by nature considerably less quantities of larger sized particles present therein. In the case of the latter clays particularly, it may be desirable to fractionate the clay so as to obtain a higher concentration of increasingly smaller sized particles, for example predominantly below 1 micron or even predominantly below 0.5 micron size.

*Example I*

A plastic kaolin-type clay is mixed with a sufficient amount of water to form a fine dispersion of the clay in the water upon stirring. The water contains approximately 2% of ammonium carbonate as a peptizing agent. The dispersion is then allowed to stand for a period of time sufficient to permit the coarser particles of clay and associated minerals, such as quartz to settle to the bottom of the vessel, while the finer particles in the size range of about 2 microns and less remain dispersed in the aqueous liquid. After separating the dispersion from the settled portion, the fine particles are separated from the dispersing liquid in a continuous centrifuge and the fine particles, predominantly in the size range of 2 microns and less, are formed into a thick paste by milling with an adequate amount of water and extruded and cut into cylindrical pellets. The pellets are dried and calcined to final desired form.

In the above-described procedure variations are possible in the processing. For instance, the peptizing agent may be other suitable material such as aqueous ammonia. Also it is possible to effect fractionation of the clay particles into coarse and fine portions by subjecting the dispersion to a combined sieving and centrifuging treatment or to a continuous centrifuging treatment adapted to separation of the coarse particles from the finer particles and also separating the finer particles from the dispersing liquid. Likewise, a washing step may be employed to remove the traces of peptizing agent from the collected smaller sized fraction. It is to be noted, also, that the smaller sized fraction may, after separation, be dried, or washed and dried, and then calcined for subsequent use as powdered catalyst in fluidized solids contacting operation or other systems employing powdered catalyst. Likewise, shaped masses other than the extruded cylindrical form may be employed, such as chunks, spheroids or other.

*Example II*

A plastic raw Florida clay known as Edgar Plastic Kaolin was fractionated by sedimentation into two particle size groups of +2 micron material (approximately 34% of original clay) and −2 micron material. Both these fractions were then pelleted separately in the manner described in Example I and the pellets dried and calcined at about 1350° F. for 4 hours in the presence of steam. The −2 micron fraction contained more than 75% material of less than 1 micron size.

On testing the original material and the two fractions formed by sedimentation for their catalytic activity (Cat-A) in the treatment of a gas oil, the following comparative results were obtained:

| Catalyst | | Cat-A Results | | | |
|---|---|---|---|---|---|
| Percent >2 Microns | Percent <2 Microns | Percent Gasoline | Percent Coke | Percent Gas | Gas Gravity |
| 33.01 | 64.34 | 23.8 | 1.1 | 1.5 | 1.38 |
| -------- | 100 | 27.1 | 1.3 | 2.0 | 1.37 |
| 100 | -------- | 18.3 | 0.6 | 1.0 | 1.22 |

It is shown by these data that the output in desired products obtained by catalytic cracking is substantially higher in the case of the use of pelleted catalyst composed of 2 microns and less particle size not only as compared with a catalyst material entirely composed of coarser particles but also in comparison with a material composed of particles of mixed very fine and coarser size, as present in the original clay material, the catalytic cracking activity of the small sized particle catalyst showing to be about 14% greater than that of the catalyst prepared from raw clay.

In contrast to the above plastic kaolin, another kaolin clay but of the nonplastic type (from Georgia), known as Monarch kaolin, showed no significant difference in Cat-A gasoline activity when comparing the larger than 2 microns fraction with the finer fraction and with the non-fractionated material.

The improved activity of the finer particle size fraction of a plastic kaolin clay is even better demonstrated in the cracking of heavier gas oils. Thus, it was found in the cracking of an East Texas heavy gas oil cut (56% of the lower boiling end and 23% of the higher boiling end removed) that the portion from Edgar Plastic Kaolin of less than 1 micron size had twice the catalytic activity exhibited by the nonfractionated clay containing that portion, as determined by the respective space rates required to obtain 50 volume percent conversion of the hydrocarbon charge. By the same test the less than two microns fraction exhibited an activity of about 1.7 times that of the nonfractionated clay.

*Example III*

A <1 micron fraction of Edgar Plastic Kaolin was pelleted and the pellets treated in a stream of 25 mol percent $H_2S$ in nitrogen at 1500° F. for 2 hours. The pellets were then cooled to room temperature and treated with $NH_4Cl$ vapor in admixture with air, obtained by passing the air through a vaporizing chamber containing $NH_4Cl$ crystals. The quantity of $NH_4Cl$ employed was about 10 times the stoichiometric requirement for conversion of the $Fe_2O_3$ in the clay to $FeCl_3$.

Following the $NH_4Cl$ treatment the reaction vessel was purged with inert gas ($N_2$) and the pellets discharged.

Analyses of the pellets before and after treatment indicated that the original 0.86% $Fe_2O_3$ had been brought to 0.25%, or about 71% removal of the original iron content.

In the foregoing description, reference has been made to plastic kaolin clays. The term "plastic" as applied to clays is well understood by those working in the art and the term is here employed in that sense. As a "rule of thumb" guide, the plastic clays are distinguished by slippery feel and stickiness in wetted state, ease of shaping by hand pressure and retention of shape, low extrusion pressures required and durability of the physical structure of extruded masses in their wet as well as more particularly in their dried state.

Obviously many modifications and variations of the invention as hereinbefore set forth may be made without departing from the spirit and scope thereof, and therefore only such limitations should be imposed as are indicated in the appended claims.

What is claimed is:

1. A process of preparing granular aggregates of a catalytic contact material from kaolin clay which includes the steps of subjecting a plastic kaolin clay containing particles of larger than two micron size and finer sized particles to a procedure effective in separating the particles to form a fraction composed of not less than 80% particles of two micron size and smaller; shaping the fraction consisting predominantly of such two micron size and smaller particles of such plastic kaolin into granular aggregates; subjecting such aggregates to an elevated temperature treatment to form attrition resistant aggregates; subjecting such heat treated aggregates to a gas stream containing hydrogen sulfide at an elevated temperature of at least 1200° F. to form partially reacted aggregates; subjecting such partially reacted aggregates at an elevated temperature to a reactant gas containing ammonium chloride for the selective removal of a portion of the iron content of the kaolin to purify the kaolin; and subjecting the thus purified aggregates to further heat treatment to prepare granular aggregates of a cracking catalyst possessing a significantly higher activity for the cracking of high boiling hydrocarbons to hydrocarbons of the gasoline boiling range than granular aggregates prepared from particles having a particle size larger than two microns.

2. The method of claim 1 in which the separation of the plastic kaolin clay is accomplished by sedimentation.

3. The method in accordance with claim 1 wherein the separation of the particles is effected by centrifuging of an aqueous dispersion of particles.

4. A process in accordance with claim 1 wherein said separation of the larger sized particles is carried out by dispersing particles in an inert gaseous medium in such a manner that at least a preponderant portion of coarser particles remains undispersed, whereupon the preponderantly fine particles of a size of not more than about two microns is treated in cyclones to separate said dispersed fine particles from said gaseous medium.

References Cited in the file of this patent

UNITED STATES PATENTS

| | | |
|---|---|---|
| 2,364,145 | Huppke et al. | Dec. 5, 1944 |
| 2,423,686 | Cummins | July 8, 1947 |
| 2,466,046 | Shabaker et al. | Apr. 5, 1949 |
| 2,576,653 | Thomas | Nov. 27, 1951 |
| 2,650,202 | Hawes et al. | Aug. 25, 1953 |
| 2,686,161 | Stewart | Aug. 10, 1954 |